(12) United States Patent
Collins et al.

(10) Patent No.: US 6,788,054 B2
(45) Date of Patent: Sep. 7, 2004

(54) METHOD AND APPARATUS FOR PROBE SENSOR ASSEMBLY

(75) Inventors: Duane Zedric Collins, El Paso, TX (US); Samuel Roland Palfenier, El Paso, TX (US); Mark Anthony Shost, El Paso, TX (US); Stephen G Paddock, El Paso, TX (US); David W Lehrschall, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/281,061

(22) Filed: Oct. 25, 2002

(65) Prior Publication Data

US 2004/0080317 A1 Apr. 29, 2004

(51) Int. Cl.⁷ .......................... G01R 33/00; G01B 7/30
(52) U.S. Cl. ................ 324/262; 324/207.25; 324/174; 361/807; 73/493; 73/866.5
(58) Field of Search .......................... 324/174, 207.16, 324/207.17, 207.25, 262, 207.15, 207.18; 361/807; 73/493, 866.5

(56) References Cited

U.S. PATENT DOCUMENTS

| | | | | |
|---|---|---|---|---|
| 4,616,504 A | * | 10/1986 | Overcash et al. .......... 73/118.1 |
| 5,426,844 A | * | 6/1995 | Suda et al. .................... 29/606 |
| 5,486,758 A | * | 1/1996 | Hammerle ................... 327/174 |
| 5,563,510 A | * | 10/1996 | Gorrell et al. ............... 324/174 |
| 5,675,248 A | * | 10/1997 | Kurita et al. ................ 324/174 |
| 6,588,931 B2 | | 7/2003 | Betzner et al. | |

* cited by examiner

Primary Examiner—Jay Patidar
(74) Attorney, Agent, or Firm—Jimmy L. Funke (57) ABSTRACT

A sensor package and method of making the same is disclosed in which the sensor package includes a sensor component for electromagnetic sensing having a holder assembly with the sensor component disposed at one end and sensor terminals in electrical communication with the sensor component extending from an opposite end. A harness assembly having a harness head configured with harness terminals extending therefrom for electrical connection with corresponding sensor terminals. The holder assembly and harness head are configured with a means for snap-fit assembly that provides space to mechanically connect corresponding sensor terminals and harness terminals with each other forming a resultant subassembly for insertion into a sensor housing. The housing further includes a heat-staked interface with the harness head that secures the subassembly relative to the sensor housing. A bracket and an elastomeric seal may be disposed in corresponding grooves configured on the sensor housing to complete assembly of the sensor package.

27 Claims, 5 Drawing Sheets

METHOD AND APPARATUS FOR PROBE SENSOR ASSEMBLY

TECHNICAL FIELD

The present disclosure relates to a sensor assembly and method of making the same. More particularly, the present disclosure relates to connecting a spool assembly containing the sensor element to a harness assembly. Still more particularly, the present disclosure relates to a sensor assembly, wherein electrical interaction between the spool assembly and the harness assembly results in elimination of an over-mold interface between the harness assembly and a housing in which the spool assembly is disposed.

BACKGROUND OF THE INVENTION

Virtually all such sensors are of the magnetic type, either variable reluctance or galvanomagnetic (e.g. Hall generators or magnetoresistors). Galvanomagnetic or digital sensors are becoming progressively more preferred due to their capability of greater encoding flexibility and speed independent output signals. Magnetic sensors operate on the principle of detecting magnetic flux density modulation caused by the movement of appropriately configured reluctors (or targets).

Variable reluctance (VR) sensors and digital sensors are commonly designed having an integral harness assembly. The harness assembly includes a connector assembly at one end for operable electrical connection as an input and a grommet that is over-molded to the wiring harness having leads extending therefrom at an opposite end for operable electrical connection with a sensor element of a spool or holder assembly. The spool assembly is then disposed within a sensor housing or cap.

Prior art sensor assemblies having harness leads extending from the harness assembly are typically crimped to leads extending from the spool assembly for electrical connection therewith. The sensor housing or cap open at one end is then slid over the spool assembly resulting in a subassembly that is then over-molded to form an over-molded seal cover. The over-molded seal cover is disposed over a perimeter of both the cap and grommet to seal the crimped electrical interface between the grommet and the spool assembly by sealing the open end of the cap with the over-mold grommet. After the subassembly is over-molded, brackets, o-rings, clips, and the like may be added to complete the sensor assembly.

With regard to production of an integrated assembly, the prior sensors have presented some challenges. In particular, VR and digital sensors include a large number of delicate parts that must be maintained in a connected state during packing in a housing. The crimped wire connections between components are particularly fragile. The crimped wire connections have been known to break easily during over-molding, as a result of thermal stress, thermal cycling and/or vibration during servicing and for other reasons. Over-molding a sensor having 40 gauge wire is a primary cause of stress that the sensor experiences and can also accelerate failures in less than desirable soldered and crimped terminal connections. In addition, the difference in thermal coefficients of expansion between the plastic, coil wire, harness and crimped terminal connections may cause the sensor to fail prematurely in the field It would be desirable to have a sensor assembly that would overcome the above disadvantages without involving extra steps and expense.

SUMMARY OF THE INVENTION

A sensor package and method of manufacturing for magnetic sensing in a vehicle is disclosed. In an exemplary embodiment, a sensor package includes a holder assembly having two sensor terminals extending therefrom. The sensor terminals are in electrical communication with a sensor element configured for electromagnetic sensing. The holder assembly is configured for disposing the sensor element therewith. A harness assembly includes a connector at one end for connection with another device and a harness head at an opposite end in electrical communication with the connector. The harness head includes two harness terminals extending therefrom configured for electrical communication with the corresponding sensor terminals. The sensor package also includes a means for snap-fit assembly between the holder assembly and the harness head. The sensor package further includes a sensor housing having a cavity for receiving a sensor subassembly therein, the sensor subassembly including the holder assembly assembled with the harness head. The sensor housing has a sealable interface with the harness head. The sealable interface is configured to admit and secure the sensor element therein and provide protection from an outside environment.

In another embodiment, a method for manufacturing a sensor package is disclosed. The method includes: configuring a harness head having a pair of harness terminals extending therefrom for operable electrical communication with a sensing element and configuring a holder assembly to maintain the sensing element in a lower portion of the holder assembly and maintain a pair of sensor terminals extending from an upper portion of the holder assembly; the pair of sensor terminals are in electrical communication with the sensing element. The method further includes configuring the harness head and holder assembly with a corresponding means for snap-fit assembly to each other and connecting the pair of harness terminals with the pair of sensor terminals. A sensor housing is configured to seal the sensing element and the connected terminals from an outside environment. A resultant subassembly having the harness head assembled with the holder assembly is inserted into the sensor housing and harness head is heat-staked with the sensor housing to fix the subassembly relative to the sensor housing.

The above-discussed and other features and advantages of the present invention will be appreciated and understood by those skilled in the art from the following brief description of the drawings.

BRIEF DESCRIPTION OF THE DRAWINGS

Referring to the exemplary drawings, which are meant to be exemplary, not limiting, and wherein like elements are numbered alike in several figures.

DETAILED DESCRIPTION OF THE INVENTION

Figure 1:
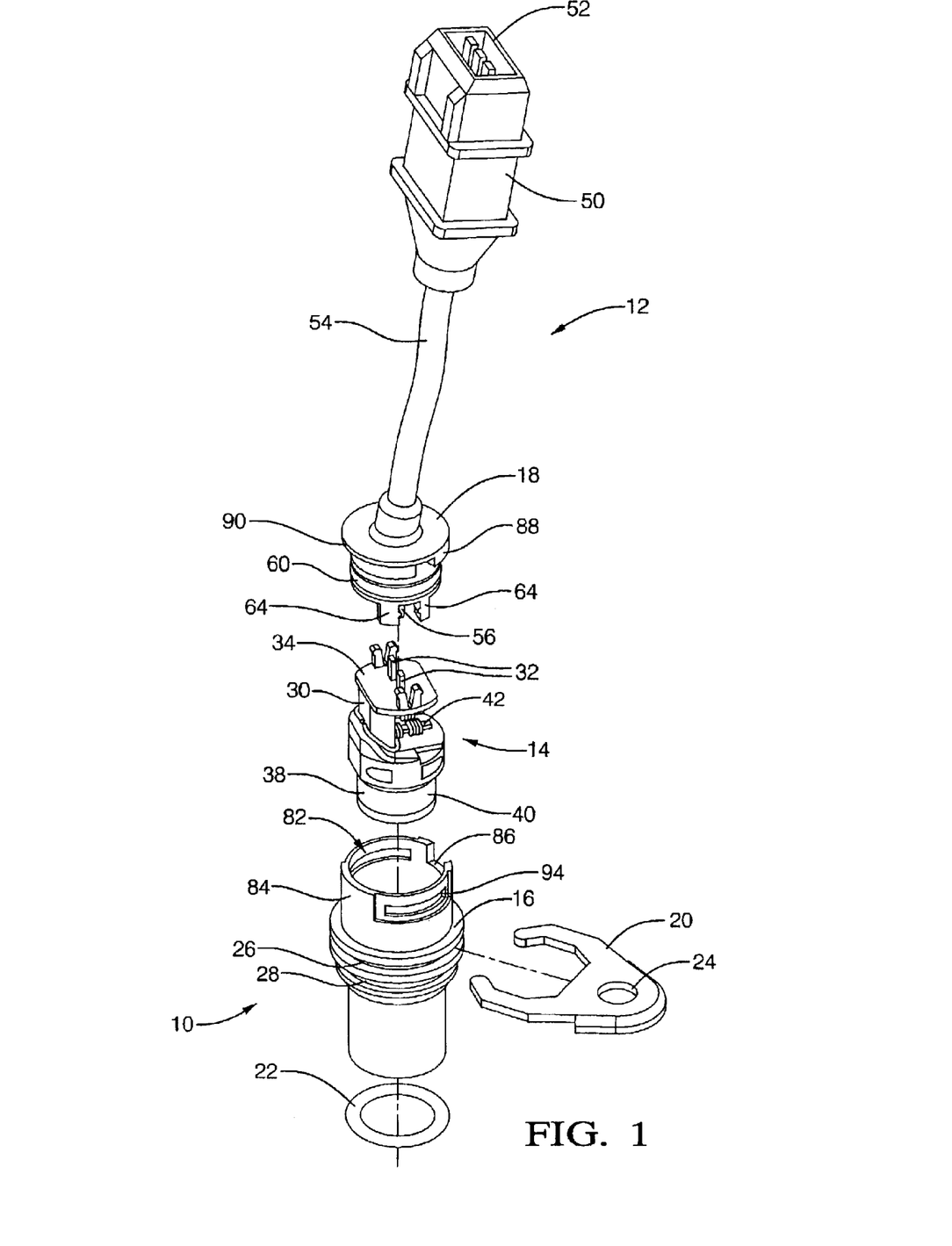
FIG. 1 is an exploded perspective view of a VR sensor assembly according to one embodiment of the present disclosure.
Figure 2:
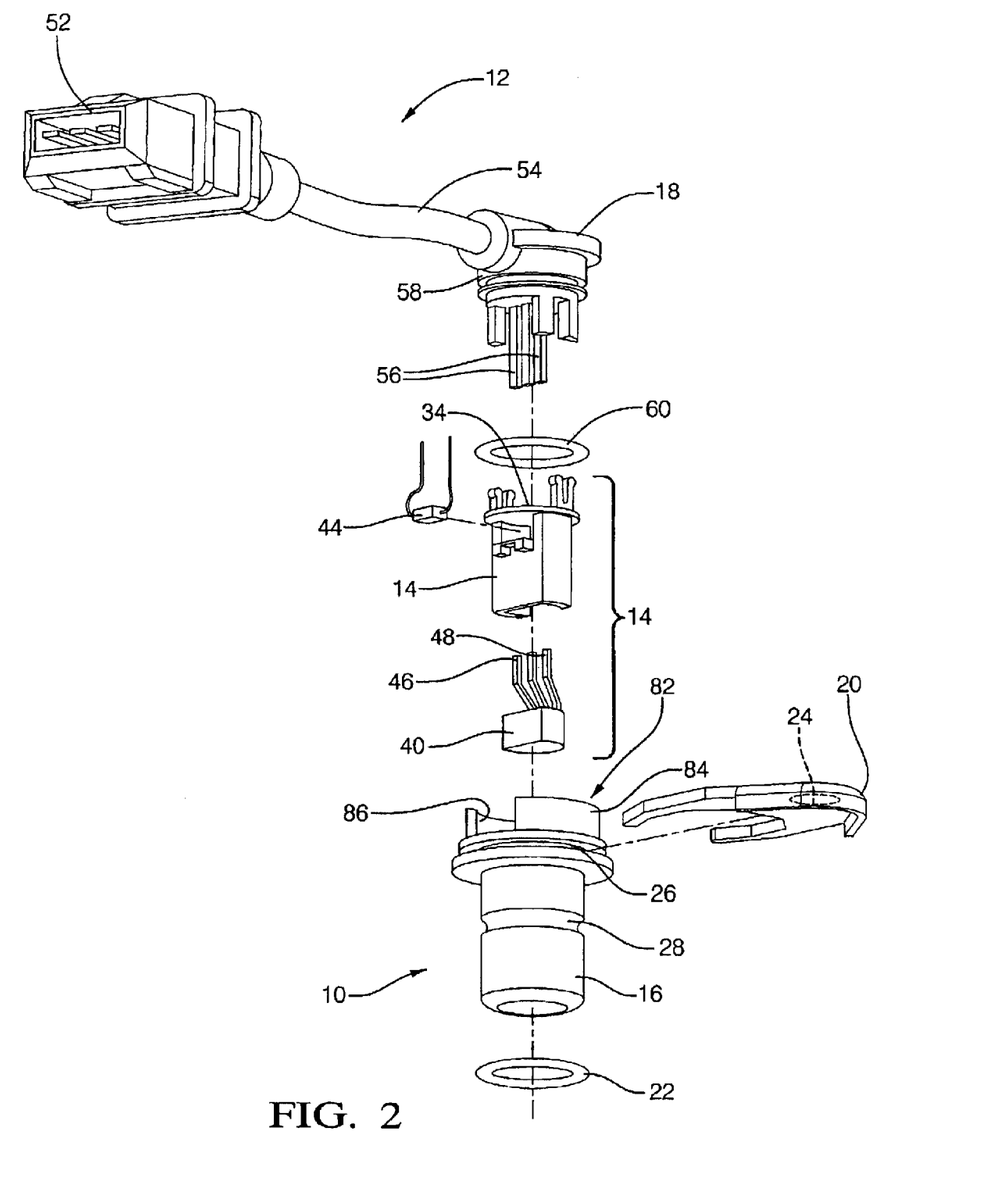
FIG. 2 is an exploded perspective view of a digital sensor assembly according to another embodiment of the present disclosure.

Referring now to the Drawings, FIGS. 1 and 2 generally depict two exemplary embodiments of a sensor assembly 10 according to the present disclosure, wherein the sensor assembly 10 serves to eliminate an overmold interface proximate terminal leads between a harness assembly 12 and spool or holder assembly 14 for electrical connection therebetween, which is subject to failure when prior art sensor assemblies involve subsequent over-molding in this region. In this regard, subsequent over-molding in the prior art is replaced by heat staking a sensor housing or cap 16 to a harness head 18 of harness assembly 12 to seal the sensor element from the outside environment.

Sensor assembly 10 in FIG. 1 is a VR sensor assembly 10. Sensor assembly is composed of a subassembly including harness assembly 12, spool assembly 14, and cap 16. A bracket 20 and o-ring 22 is disposed around cap 16 after the subassembly is completed for mounting the completed sensor assembly within a substrate bore (not shown), such as a transmission case bore for sensing the velocity of a transmission gear, for example. More specifically, bracket 20 includes a mounting hole 24 at one end for receipt of a mechanical fastener such as a bolt or stud with a complementary nut to secure bracket 20 relative to a horizontal surface of an engine block, for example. Bracket 20 is configured at an opposite end for location within and crimping engagement with a groove 26 configured in cap 16. This not only ensures that the sensor assembly 10 will remain permanently associated with respect to bracket 20, but further ensures the orientation of the sensor assembly with respect to the reluctor or target (not shown) will be correct. It is to be understood that those ordinarily skilled in art may utilize any known modality to trap and/or permanently orient the sensor assembly with respect to the bracket, and that the various views of the present disclosure are by way of exemplification and not limitation.

Cap 16 is further configured with a second groove 28 for receiving and retaining o-ring 22 therein. O-ring 22 is configured to seal cap 16 in a bore in which it is disposed for limiting passage of fluids thereby that may be hostile to the-components of sensor assembly 10.

Figure 3:
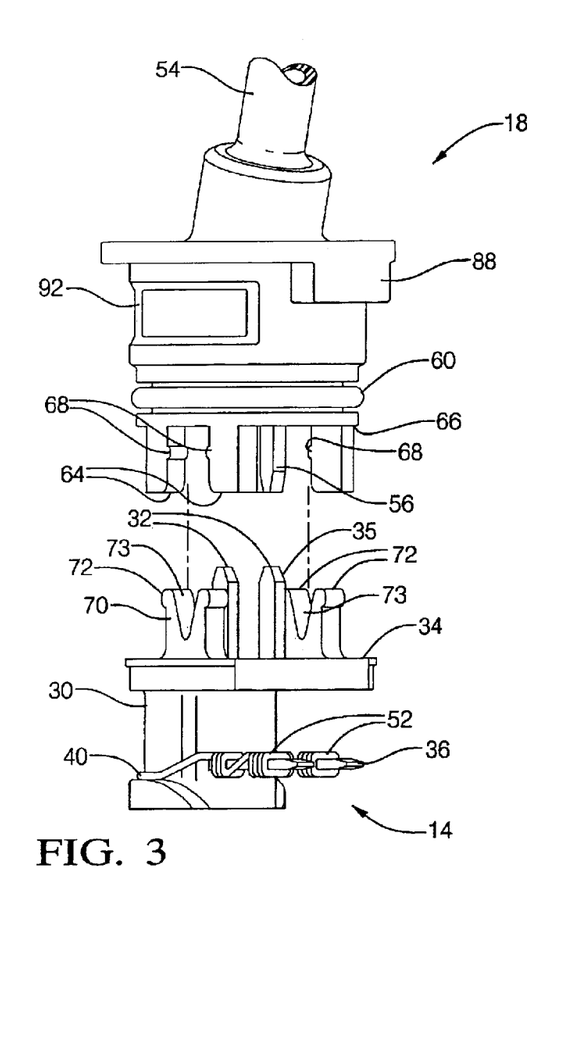
FIG. 3 is an enlarged partly perspective view of FIG. 1 illustrating a snap-fit connection features between a spool assembly and an over-molded head of a harness assembly.

Still referring to FIG. 1 in conjunction with FIG. 3, spool assembly 14 includes spool body 30 having a pair of L-shaped terminals 32 molded therein and extending from a top surface 34 thereof. A vertical portion 35 of each L-shaped terminal 32 extends from top surface 34 while a horizontal portion 36 of each L-shaped terminal 32 extends from an intermediate portion of spool body 30 extending substantially perpendicular to vertical portion 35. Although terminals 32 have been described as substantially L-shaped terminals, other suitably shaped terminals 32 are contemplated. Spool body 30 includes a lower portion 38 having a coil 40 wound around spool body 30. Ends 42 of coil 40 terminate with electrical connection with a corresponding horizontal portion 36 of L-shaped terminals 32.

Referring now to FIGS. 1 and 2 in conjunction with FIG. 3, spool assembly 14 in FIG. 1 is alternatively replaced with holder assembly 14 in FIG. 2 for a digital sensor assembly 10. An active sensor package or element 40, can be received in a lower end of holder assembly 14. The active sensor is a sensor that includes a solid-state chip for sensing changes in a magnetic field. Examples of active sensors include Hall effect sensors, MR sensors and the like. An optional capacitor 44 (shown in FIG. 2) can be located in a slot in the upper end of the holder assembly 14 adjacent the terminals 46, 48 extending from active sensor 40. The capacitor is bridged across the terminals 46, 48. It will be noted that although holder assembly 14 and harness head have been disclosed as separate pieces of sensor assembly 10, holder assembly 14 and harness head 18 are optionally configured as an integral one piece assembly.

Harness assembly 12 is composed of a connector body 50 at one for connection as an input device to another device, such as a control module, for example. Connector body 50 is preferably moldably configured with terminal tabs 52 extending at one end and a wiring 54 electrically connected to corresponding tabs 52 extending from another end of connector body 50.

Harness assembly 12 is further composed of harness head 18 over-molded to wiring 54 opposite connector body 50. Harness head 18 is over-molded having harness head terminals 56 electrically connected with wiring 54 corresponding to tabs 52 of connector body 50. Head terminals 56 extend from harness head 18 for operable electrical connection with corresponding terminals 32 extending from spool or holder assembly 14. Harness head 18 further includes an internal o-ring groove 58 for receiving and retaining an internal o-ring 60. O-ring 60 is configured to form a seal between harness head 18 and an inside portion of cap 16 to isolate the electrical connection of harness assembly 12 with spool or holder assembly 14.

Figure 4:
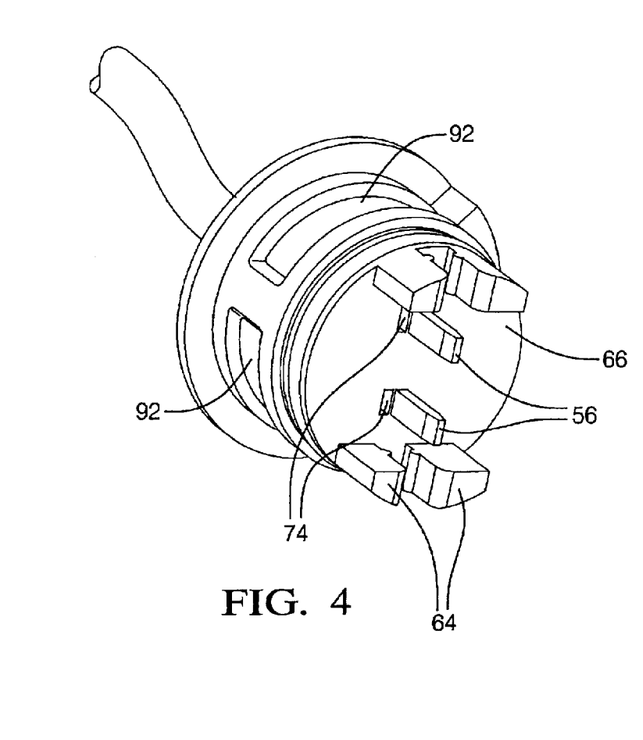
FIG. 4 is a perspective view of the over-molded head of FIG. 3 illustrating the snap-fit connection in more detail and a pair of terminal pockets.

Referring now to FIGS. 3 and 4, operable connection of spool assembly 14 with harness assembly 12 is described in more detail. In an exemplary embodiment, harness head 18 further includes four prongs 64 extending from a bottom surface 66 of head 18. The four prongs 64 are arranged on a perimeter defining bottom surface 66. Each prong includes a means for engaging a corresponding means extending from a top surface 34 of spool assembly 14 for locking engagement between harness assembly 12 and spool assembly 14. In an exemplary embodiment, the means includes a snap feature 68 extending from each prong 64 facing a corresponding snap feature 68 extending from an adjacent prong 64. Snap features 68 extending from two adjacent prongs 64 lockingly engage with a latch feature 70 extending from top surface 34 of spool assembly 14. Each latch feature 70 is aligned to latch with two corresponding prongs 64. In an exemplary embodiment shown in FIG. 3, latch feature 70 is configured having two hooks 72 opposing each other. Each hook 72 is configured to receive and then latch with a corresponding snap feature 68. Each latch feature 70 having hooks 72 defining outboard sides of each latch feature 70 includes a space 73 configured therebetween to allow resilient movement of hooks 72 during snap lock engagement with corresponding snap features 68 on corresponding prongs 64.

It will be recognized by one skilled in the art that snap features 68 and latch features 70 are configured to cooperate in snap-fit assembly. For example, a periphery of bottom surface 66 of harness head 18 may include a plurality of snap-fit connectors, preferably resilient, ribs, teeth, grooves, flanges, and the like to cooperate in a snap-fit arrangement with a complementary configured latch feature 70 on top surface 34 of spool assembly 14. In addition, it will be noted that at least one of latch feature 70 and snap feature 68 may optionally be resilient to facilitate connection, while making difficult disconnection therebetween.

Referring now to FIG. 4, bottom surface 66 of harness head includes two terminal pockets 74 configured and aligned to locate terminals 32 extending from top surface 34 of spool assembly 14. Terminal pockets 74 are proximate terminals 56 extending from bottom surface 66 of harness head 18, such that terminals 56 are slidably connected to corresponding terminals 56 as harness head 14 is engaged with spool assembly 14 via the means for such lockable engagement discussed above.

Figure 5:
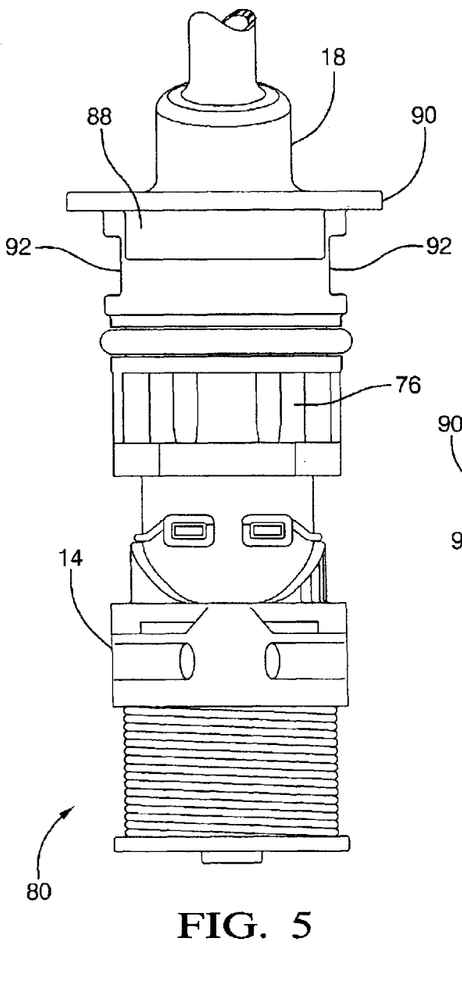
FIG. 5 is a front view of the spool assembly and the over-molded head of a harness assembly shown in FIG. 3 illustrating connection therebetween.
Figure 6:
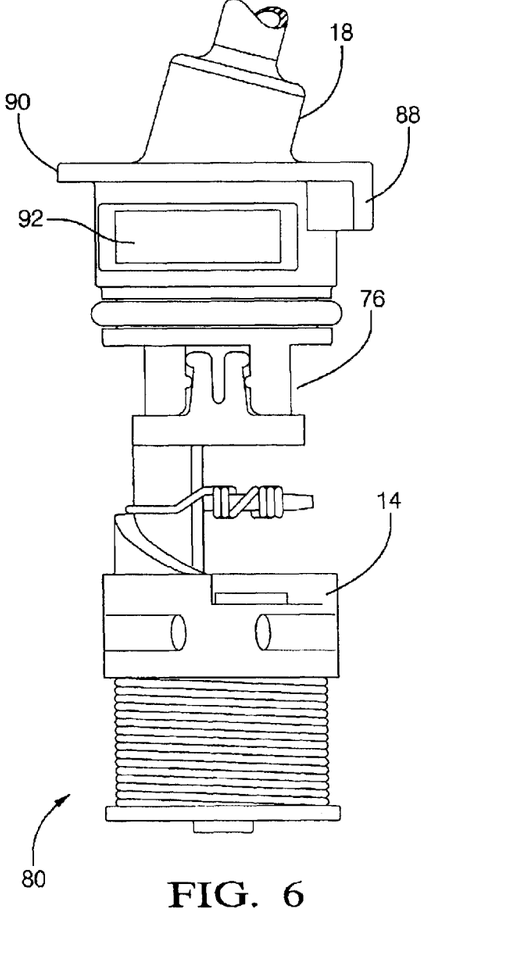
FIG. 6 is a side view of the spool assembly and the over-molded head of a harness assembly shown in FIG. 5.

Referring now to FIGS. 5 and 6, harness head 18 is illustrated as being assembled to spool assembly 14. It will be recognized in this assembled state that terminals 56 and 32 are exposed as a result of an opening 76 provided between prongs 64. Opening 76 allows enough space to provide resistance welding of corresponding terminals 32, 56. By resistance welding terminals 32 and 56, the need to crimp terminals together is eliminated and replaced by a more robust process.

Referring now to FIGS. 1–8, after snap-fit engagement between harness assembly 12 and spool assembly 12 and subsequent resistance welding of terminals 32, 56, a resultant subassembly 80 shown in FIGS. 5 and 6 can be inserted through an opening 82 in cap 16. Opening 82 is defined by an upper wall 84 defining an upper portion of cap 16. Opening 82 is further defined by a notch 86 configured in upper wall 84. Notch 86 is configured to align with a complementary configured anti-rotation feature 88 extending from a flange 90 of harness head 18. Anti-rotation feature 88 prevents movement of subassembly 80 with respect to cap 16. Furthermore, harness head 18 is configured with at least one heat-stake groove 92 aligned with a corresponding heat stake groove 94 configured in upper wall 84 of cap 16. In an exemplary embodiment as depicted, two corresponding and complementary heat-stake grooves 92, 94 are configured in harness head 16 and upper wall 84, respectively. Heat stake-grooves 92, 94 are configured to hold a heat-stake that is applied upon assembling subassembly 80 with cap 16.

Figures 7, 8:
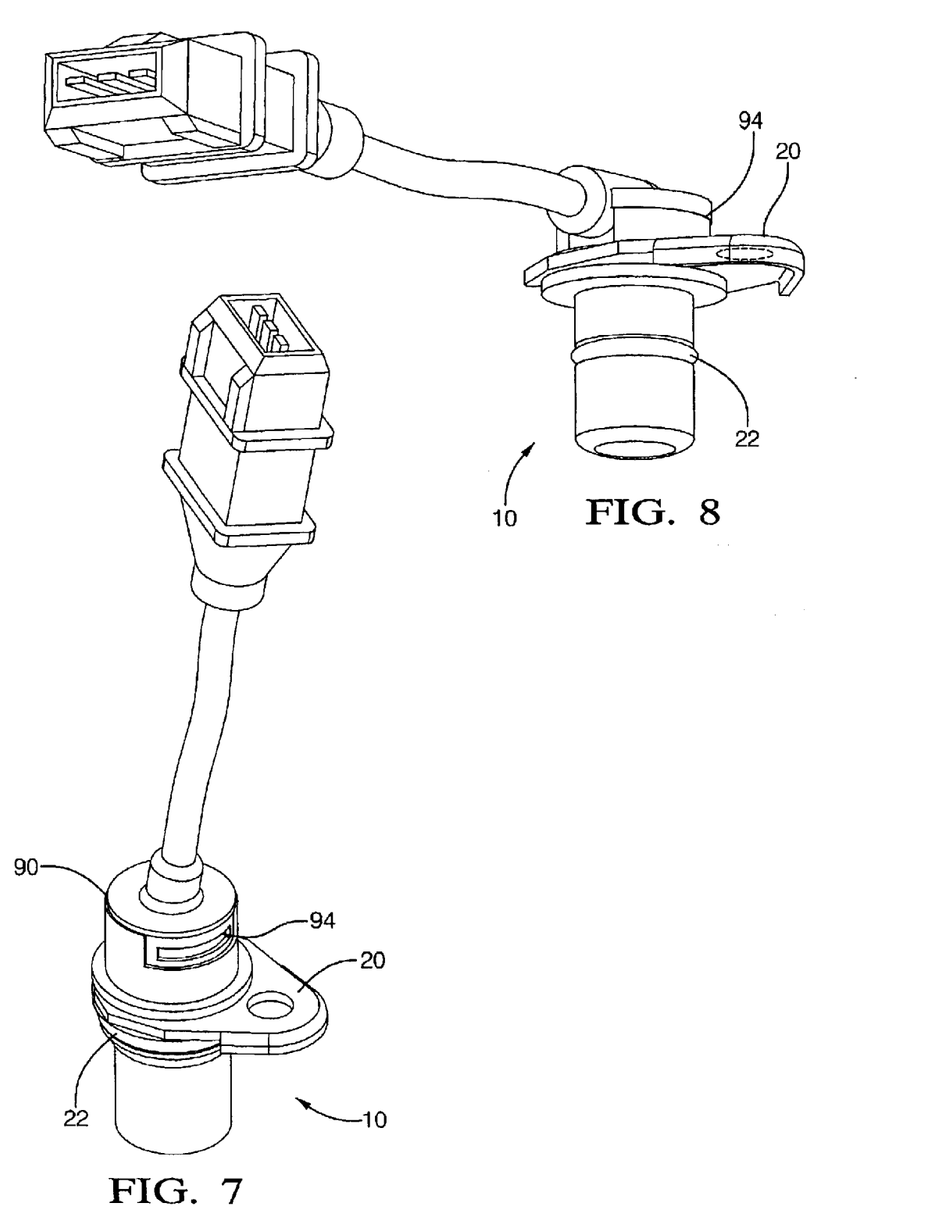
FIG. 7 is a perspective view of an assembled VR sensor shown in FIG. 1.
FIG. 8 is a perspective view of an assembled digital sensor shown in FIG. 2.

Referring now to FIGS. 7 and 8, flange 90 of harness head 18 is configured to complete the top of a resulting completed sensor assembly 10 with the aid of o-ring 60 forming a seal to seal the outside environment from entering into the sensor cavity defined by cap 16. Once cap 16 and harness head 18 of harness assembly 12 are heat-stacked, there is no need for over-molding as in the prior art.

Referring again to FIGS. 1–3, the components of sensor assembly 10 are assembled as follows. First, harness head 18 of harness assembly 12 is aligned with spool or holder assembly 14 for connection therewith. More specifically, the terminals 32 are aligned with terminal pockets 74 on bottom surface 66 of harness head 18 and snapped into the corresponding snap retention features 68 and 70. The leads 32, 46, 48 of the sensor element package, and optionally the capacitor in an active sensor element package, can be resistance welded to the terminals 56 extending from the harness head 18 or attached and electrically connected by any appropriate known method. The advantage of the present arrangement includes the relatively robust connection between terminals 32, 46, 48 and 56, which is not possible with crimping terminals of the prior art.

Next, the resulting subassembly of the connected harness assembly 12 and spool/holder assembly 14 is inserted into sensor housing or cap 16 and heat-staking harness head 18 to an upper portion of cap 16 using corresponding heat-stake grooves 92, 94. In an exemplary embodiment, the harness head and cap are fabricated with a thermoplastic material. The molded thermoplastic material seals the sensor cavity from the outside environment by molding flange 90 and anti-rotation feature 88 extending from flange 90 of harness head 18 to align and cover cap 16 defining opening 82 thereof. The molded thermoplastic material also seals the sensor cavity from the outside environment with help from o-ring 60 to seal a gap formed between a bore defined by cap 16 and an outside surface of harness head 18. In a preferred embodiment, harness head 18 includes a circumferential channel 58 configured therein to retain o-ring 60.

The above described sensor assembly and method of manufacture eliminate the over-molding process by placing the cap over the spool or holder assemblies that have been previously snapped to the harness assembly by snap-fit engagement means that also provides suitable space for subsequent resistance welding of the terminals therebetween. The resultant subassembly is disposed within a cap for heat-staking the cap to the harness assembly. The above disclosed nonover-mold concept allows VR and digital sensors to be produced using similar designs, tooling, and processes.

Accordingly, the above described sensor device and method of manufacturing afford simple and cost effective means to assemble a sensor body with a housing and harness assembly eliminating any need for an over-mold interface proximate crimped electrical terminals and over-molding the subassembly associated with coupling the harness assembly with the housing or cap. In addition, such means of assembling the sensor assembly prove to extend the longevity thereof by eliminating an over-mold interface proximate crimped electrical connections and thin magnetic coil wire subject to premature failure with such subsequent over-molding. The above described sensor device and method of manufacture allows for VR sensors and digital sensors to be developed using similar designs, tooling, and processes. By employing a nonover-mold engagement with a harness assembly in conjunction with a sensor assembly, simplicity, timesavings, cost savings, and reliability can be gained.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sensor package comprising:

a holder assembly having two sensor terminals extending therefrom, said sensor terminals in electrical communication with a sensor element configured for electromagnetic sensing, said holder assembly configured for disposing said sensor element therewith;

a harness assembly having a connector at one end for connection with another device and a harness head at an opposite end in electrical communication with said connector, said harness head having two harness terminals extending therefrom configured for electrical communication with corresponding said two sensor terminals;

a means for snap-fit assembly between said holder assembly and said harness head; and a sensor housing having a cavity for receiving a sensor subassembly therein, paid sensor subassembly including said holder assembly assembled with said harness head, said sensor housing having a sealable interface with said harness head, said sealable interface configured to admit and secure said sensor element therein and provide protection from an outside environment.

2. The sensor package of claim 1, wherein said means for snap-fit assembly include said holder assembly and said harness head configured with a snap-fit interface means for mechanical assembly of said sensor subassembly while allowing for mechanical connection of corresponding said sensor and harness terminals.

3. The sensor package of claim 2, wherein said snap-fit interface means provides an opening for access to allow mechanical connection of said harness and sensor terminals to secure electrical connection therebetween.

4. The sensor package of claim 1, wherein said harness head includes two terminal pockets configured to locate and align corresponding said two sensor terminals.

5. The sensor package of clam 4, wherein said terminal pockets are proximate corresponding said two harness terminals extending from said harness head, said terminal pockets arc configured to receive corresponding said two sensor terminals in slidable contact with corresponding said two harness terminals.

6. The sensor package according to claim 1 further comprising:
a bracket mechanically fixable to said sensor housing, said bracket configured to mount the sensor package with respect to an object to be sensed.

7. The sensor package according to claim 1, wherein said means for snap-fit assembly includes a snap fit connector extending from said harness head and configured for snap-fit engagement with a snap-fit latch feature extending from said holder assembly configured to facilitate mechanical assembly of said sensor subassembly and making difficult disassembly of said sensor subassembly.

8. The sensor package according to claim 1, wherein a periphery of said holder assembly and said sensor housing include a circumferential channel configured therein, each channel receptive of an o-ring to form a hermetic seal.

9. The sensor package according to claim 1, wherein said means for snap-fit assembly further comprises:
resilient means for allowing assembly of said sensor subassembly while making difficult disassembly of the same.

10. The sensor package of claim 1, wherein said scalable interface includes a flange extending from said harness head, said flange is configured to sealably cover an opening to said cavity of said sensor housing, said harness head and said sensor housing being heat-staked together.

11. The sensor package of claim 10, wherein said flange includes an anti-rotation feature extending therefrom aligned for reception in a corresponding notch configured in said sensor housing to prevent rotation of said subassembly relative to said sensor housing.

12. The sensor package of claim 1, wherein said sensor housing and said harness head include corresponding grooves configured therein to facilitate heat-staking thereof.

13. The sensor package of claim 1, wherein said sensor element is one of a variable reluctance sensor and a galvanomagnetic sensor.

14. A sensor probe assembly for a motor vehicle comprising:
a housing having a central bore and a first end open to the central bore, said housing configured for installation in a substrate, said housing having a second end opposite said first end, said second end aligned with an object to be sensed;
a first elastomeric media seal circumferentially disposed around said housing to form a hermetic seal between said substrate and said housing,
a sensor subassembly within the bore of said housing having a sensor element proximate to said second cad of said housing with a sensing area and a second opposing side extending from said bore for connection with patterned electrical leads in electrical communication with the sensing area, the sensing area in electromagnetic communication with the object to be sensed;
a second elastomeric media seal circumferentially disposed around said sensor subassembly to form a hermetic seal between said sensor subassembly and said housing;
a bracket assembly mechanically fixable to said substrate at a first end and in operable connected to said sensor subassembly at a second end, said bracket configured to fix said sensor element towards said object; and
a means for snap-fit assembly of said sensor subassembly, wherein said sensor subassembly includes:
a holder assembly having two sensor terminals extending therefrom, said sensor terminals in electrical communication with said sensor element configured for electromagnetic sensing, said holder assembly configured for disposing said sensor element therewith; and
a harness assembly having a connector at one end for connection with another device and a harness head at an opposite end in electrical communication with said connector, said harness head having two harness terminals extending therefrom configured for electrical communication with corresponding said two sensor terminals.

15. The sensor probe assembly according to claim 14, wherein said means for snap-fit assembly include said holder assembly and said harness head configured with a snap-fit interface means for mechanical assembly of said sensor subassembly while allowing for mechanical connection of corresponding said sensor and harness terminals.

16. The sensor probe assembly of claim 15, wherein said snap-fit interface means provides an opening for access to allow mechanical connection of said harness and sensor terminals to secure electrical connection therebetween.

17. The sensor probe assembly of claim 14, wherein said harness head includes two terminal pocket configured to locate and align corresponding said two sensor terminals.

18. The senior probe assembly of clam 17, wherein said terminal pockets are proximate corresponding said two harness terminals extending from said hardness head, said terminal pockets are configured to receive corresponding said two sensor terminals in slidable contact with corresponding said two harness terminals.

19. The sensor probe assembly of claim 14, wherein said sealable interface includes a flange extending from said harness head, said flange is configured to sealably cover said bore of said sensor housing, said harness head and said sensor housing being heat-staked together.

20. The sensor probe assembly of claim 19, wherein said flange includes an anti-rotation feature extending therefrom aligned for reception in a corresponding notch configured in said sensor housing to prevent rotation of said subassembly relative to said sensor housing.

21. The sensor probe assembly of claim 14, wherein said sensor housing and said harness head include corresponding grooves configured therein to facilitate heat-staking thereof.

22. The sensor probe assembly of claim 14, wherein said sensor element is one of a variable reluctance sensor and a galvanomagnetic senior.

23. A method of assembling a senior package, the method comprising:
   configuring a harness head having a pair of harness terminals extending therefrom for operable electrical communication with a sensing element;
   configuring a holder assembly to maintain said sensing element in a lower portion of said holder assembly and maintain a pair of senior terminals extending from an upper portion of said holder assembly, said pair of sensor terminals in electrical communication with said sensing element;
   configuring said harness head and said holder assembly with a corresponding means for snap-fit assembly to each other;
   connecting said pair of harness terminals with said pair of sensor terminals;
   configuring a sensor housing to seal said sensing element and said connected terminals from an outside environment;
   inserting a resultant subassembly having said harness head assembled with said holder assembly into said senior housing; and
   connecting said harness head with said sensor housing to fix said subassembly relative to said sensor housing.

24. The method of claim 23, wherein said harness head is further configured having corresponding terminal pockets proximate said harness terminals for receiving said pair of sensor terminals in electrical communication with said sensing element.

25. The method of claim 23 further comprising:
   mounting a bracket to said sensor assembly for attaching the sensor package to a vehicle; and
   mounting a first elastomeric media seal circumferentially disposed around said sensor housing to form a hermetic seal between said sensor housing and a bore in which said sensor housing is disposed.

26. The method of claim 25, wherein said configuring said sensor housing to seal said sensing element and said connected terminals from said outside environment includes a second elastomeric media seal circumferentially disposed around said harness head to form a hermetic seal between an upper portion of said sensor housing and said harness head disposed therein.

27. The method of claim 26, wherein said configuring said sensor housing to seal said sensing element and said connected terminals from said outside environment includes corresponding grooves configured in said upper portion of said sensor housing and said harness head, said corresponding grooves facilitate said heat-staking.

* * * * *